(12) United States Patent
Kabasin et al.

(10) Patent No.: US 6,592,095 B2
(45) Date of Patent: Jul. 15, 2003

(54) ELECTROMAGNETIC VALVE MOTION CONTROL

(75) Inventors: Daniel Francis Kabasin, Rochester, NY (US); Kenneth John Dauer, Avon, NY (US)

(73) Assignee: Delphi Technologies, Inc., Troy, MI (US)

( * ) Notice: Subject to any disclaimer, the term of this patent is extended or adjusted under 35 U.S.C. 154(b) by 37 days.

(21) Appl. No.: 09/829,421

(22) Filed: Apr. 9, 2001

(65) Prior Publication Data

US 2002/0145124 A1 Oct. 10, 2002

(51) Int. Cl.[7] .............................. F16K 1/52; F16K 31/02
(52) U.S. Cl. ..................... 251/64; 251/54; 251/129.01
(58) Field of Search ..................... 251/54, 64, 129.01, 251/48

(56) References Cited

U.S. PATENT DOCUMENTS 5,016,790 A * 5/1991 Thomas et al. ........... 251/54 X
6,293,514 B1 * 9/2001 Pechoux et al. ........... 251/54 X

* cited by examiner

Primary Examiner—Kevin Lee
(74) Attorney, Agent, or Firm—Patrick M. Griffin

(57) ABSTRACT

A motion control for electromagnetic valves including a follower connected with a valve for reciprocating motion, and a restraint operable on the follower to slow the valve motion and reduce the force of engagement of the valve with the valve seat and the stop. The restraint may include one of hydraulic and mechanical motion constraining devices. A hydraulic restraint device includes a hydraulic piston reciprocable within a fluid-filled reservoir having first and second chambers connected by a bypass passage and a flow tube. Fluid flow through the bypass passage and flow tube is regulated by the position of the piston relative to the bypass passage such that valve motion is slowed when fluid flow is restricted. A mechanical restraint device includes a pin and track assembly operative to develop rotational motion of the valve for slowing the valve motion.

10 Claims, 5 Drawing Sheets

ELECTROMAGNETIC VALVE MOTION CONTROL

TECHNICAL FIELD

This invention relates to electromagnetic valves, such as for engines, and, more particularly, to valves with motion controlling restraint devices for slowing the opening and closing of such valves.

BACKGROUND OF THE INVENTION

Electromagnetic valve actuators for use in engines typically feature an engine valve connected to an armature that is spring-centered between two electromagnets. Other prior electromagnetic valve actuators featured an opening coil cooperative with a closing spring. In either case, the armature is induced to move between a "valve closed" position where the valve head engages a valve seat and a "valve open" position where the valve engages a stop. Where movement of the armature between the open and closed positions, remains uncontrolled, however, the impact of the moving armature on the stop and valve seat respectively, not only causes wear on the stop and/or valve seat, but also causes audible valve train noise.

SUMMARY OF THE INVENTION

The present invention provides a motion controlling restraint for slowing a reciprocating valve in an electromagnetic valve actuator. The restraint is operable on a follower connected to the valve, to slow valve motion and reduce the force of engagement of the valve with the seat and stop as the valve approaches its open and closed positions respectively. The restraint of the present invention may include either hydraulic or mechanical devices.

The hydraulic restraint device of the present invention includes a hydraulic piston, which is coupled to the valve stem and is reciprocable between two fluid-filled hydraulic chambers of a cylinder. The chambers are connected by a bypass passage at locations spaced from their ends. The chambers are further connected at their ends by a restrictive flow tube. As the electromagnetic coils within the actuator energize and de-energize, the hydraulic piston moves accordingly, blocking fluid flow through one or more ports of the bypass passage and forcing it into the flow tube. Hence, flow through the bypass passage is regulated by the positional relationship of the hydraulic piston to the bypass passage. The passage size and the size and shape of the port openings between the bypass passage and the two hydraulic chambers determine the flow versus piston position transfer function relationship. The shape and size of these components is determined by the desired flow requirements of a particular engine application. Flow through the flow tube is regulated by a computer-controlled electrical valve or a pair of check valves as well as by the size of the tube.

Moreover, the hydraulic fluid pressure for all of the actuators in an engine installation can be maintained, if desired, by selectively connecting all of the chambers via an electrical valve or check valve to a common reservoir. The check valve could be calibrated to let in more fluid when the system pressure drops below a preset level; alternatively, an electrical valve could let in more fluid when a pressure transducer sensed low pressure. Such a system would further be adapted to purge air intrusion and refill passages with hydraulic fluid as necessary.

According to a mechanical restraint embodiment of the present invention, a portion of the electromotive force produced by the opening coil is used to force a pin, transversely connected to the valve stem, though a guide track. The guide track includes a straight portion, where acceleration of the valve is desired, and a curved portion where deceleration of the valve is desired, (i.e. as the valve approaches the open or closed position respectively). By forcing the device to expend energy converting linear velocity to angular velocity, the valve may be brought to a controlled stop as it approaches the valve stop or seat, as the case may be. Moreover, as the pin enters the curved area of the channel, the valve necessarily turns, further contributing to the deceleration of the valve. Ultimately, the pin will be halted when the valve contacts the valve seat or an opening-stop.

These and other features and advantages of the invention will be more fully understood from the following description of certain specific embodiments of the invention taken together with the accompanying drawings.

DESCRIPTION OF THE PREFERRED EMBODIMENTS

Figure 1:
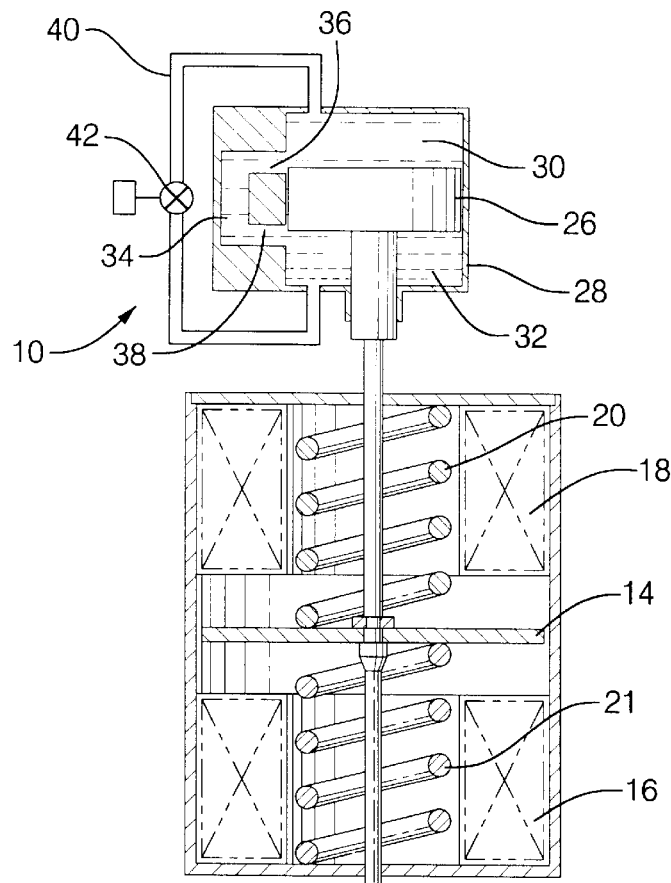
FIG. 1 is a cross-sectional view of the hydraulic restraint device of the present invention incorporated with an electromagnetic valve.
Figure 1:
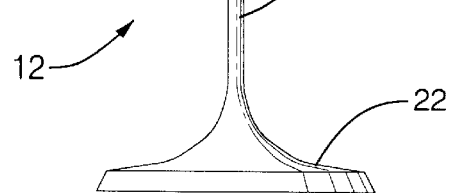

Referring now to the drawings in detail, numeral 10 generally indicates a motion control for an electromagnetic valve 12 having an armature 14 nominally centered between an opening electromagnetic coil 16 and a closing electromagnetic coil 18 by means of springs 20, 21. The electromagnetic valve 12 further includes a valve head 22 connected to the armature 14 by a valve stem 24. In the preferred embodiments, the valve stem 24 is sufficiently long to provide a connection from the armature 14 to the motion control 10. It should be understood that the electromagnetic valve 12 is merely illustrative of a type of valve incorporating the present invention; the present invention may be incorporated into a variety of valve designs, including a valve featuring an opening coil and closing spring.

The motion control 10 of FIG. 1 is hydraulically operative and includes a follower, in this case a hydraulic piston 26, reciprocable within a cylinder 28 between an upper hydraulic chamber 30 and a lower hydraulic chamber 32. The chambers are filled with hydraulic fluid (not shown) and shaft seals (also not shown) retain the fluid within the chambers. Hydraulic chambers 30 and 32 are connected at locations spaced from their ends by a bypass passage 34 having an upper port 36 and a lower port 38. A restrictive flow tube 40 connects the upper hydraulic chamber 30 and the lower hydraulic chamber 32 at their ends to form a closed loop. Disposed within the restrictive flow tube 40 is a flow control valve 42, which, in this embodiment, is electrically controlled.

Figure 5:
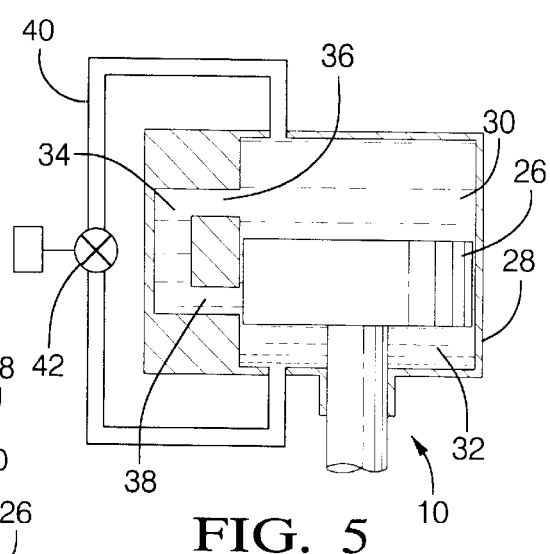
Figure 6:
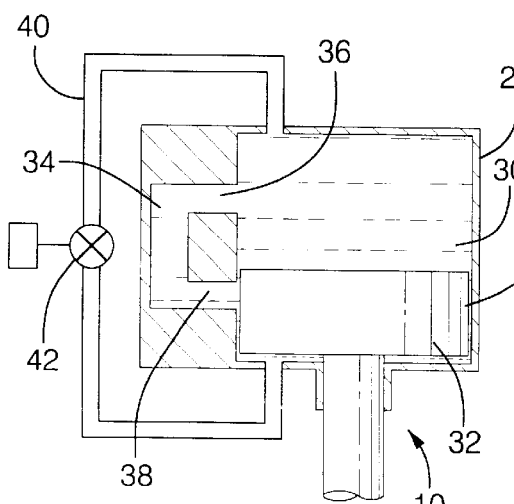
Figure 7:
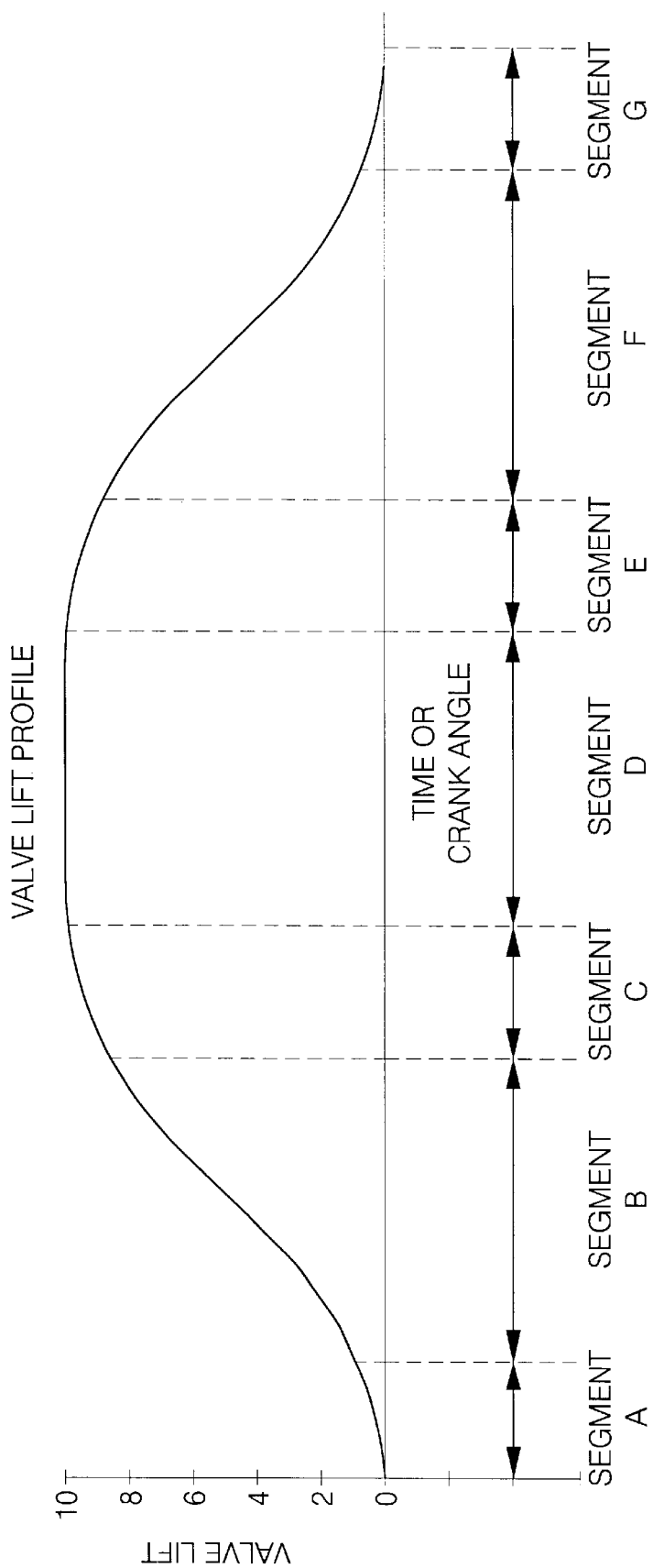
FIG. 7 is a graph illustrating a valve opening and closing profile corresponding to the schematic views of FIGS. 2–6.

FIGS. 2–6 are schematic views showing movement of the piston 26 as it moves the valve 12 from a valve closed position to a valve open position. FIG. 7 represents the valve opening and closing profile corresponding to the schematic of FIGS. 2–6, where the resistance of the electric control valve 42 was computer programmed as a function of engine RPM to maintain a desired initial velocity and acceleration of the valve.

Figure 2:
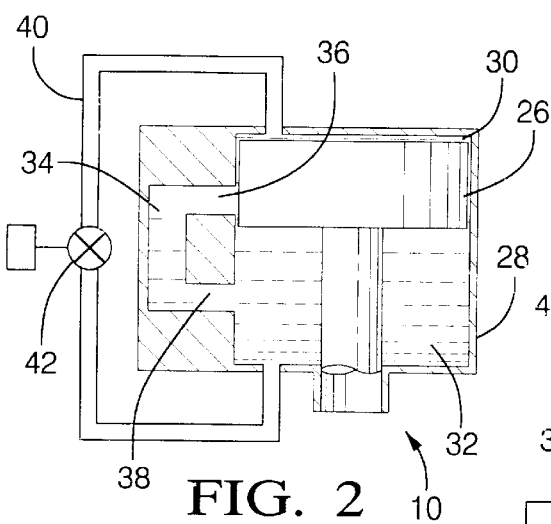
FIGS. 2–6 are schematic views showing movement of the hydraulic restraint device of the present invention as the engine valve progresses from a valve closed position to a valve open position.
Figure 3:
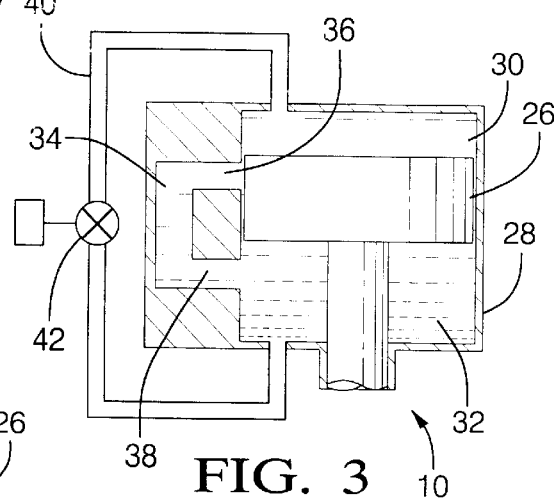

In FIG. 2, the hydraulic piston 26 is fully raised and the engine valve 12 is in a valve closed (or seated) position. When the closing coil 18 of the electromagnetic valve actuator is de-energized and the opening coil energized, engine valve 12 begins its opening action and piston 26 begins to descend. As the hydraulic piston 26 descends, it displaces the fluid in the lower hydraulic chamber 32 while blocking the upper port 36 as shown in FIGS. 2–3. Pumping resistance increases accordingly as fluid is forced through the restrictive flow tube 40, slowing the descending piston 26 and the connected engine valve 12. This is depicted graphically in FIG. 7, segment A.

Figure 4:
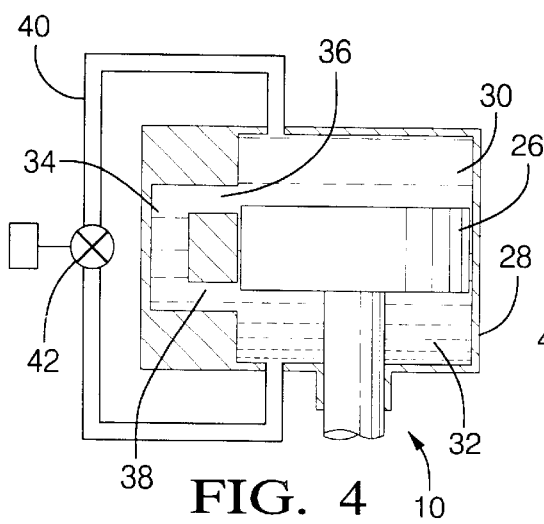

As the piston 26 clears upper port 36, pumping resistance decreases as fluid begins to flow through the upper port 36 into the upper hydraulic chamber. In response, the piston 26 and valve 12 accelerate. Maximum acceleration occurs when fluid pressure is equal in both chambers, and the resultant force on the piston is zero, as shown in FIG. 4. This is depicted graphically in FIG. 7, segment B.

The descending piston 26 encounters more resistance and decelerates accordingly as it blocks more and more of port 38 of the bypass passage and forces all of the remaining fluid though the more restrictive, valved tube 40. This is shown in FIG. 5. The increased resistance on the piston 26 serves to bring the valve 12 to a controlled stop when it reaches its valve open-stop. See segment C of FIG. 7. Ultimately, the piston will be fully descended, as shown in FIG. 6, and the engine valve 12 fully open (segment D of FIG. 7).

Upon de-energizing the opening coil and energizing the closing coil, the valve would begin closing. The previously described actions would then happen in reverse as the valve closes. This is graphically represented in segments E, F, G of FIG. 7.

Figure 8:
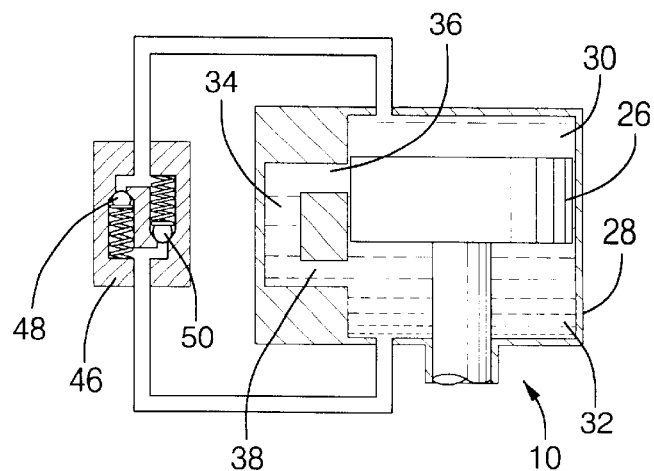
FIG. 8 is a cross sectional view of a second embodiment of the hydraulic restraint device of the present invention and illustrates dual check valves located in the restrictive flow tube.

FIG. 8 shows another embodiment of the hydraulic device according to the present invention where like numerals correspond to like items of FIG. 1–6. In this embodiment, an alternative control valve 46 is located in the flow tube 40. The control valve 46 includes a pair of check valves 48, 50. When ports to the bypass passage 36 or 38 are blocked by the descending piston 26, the pressure differential between hydraulic chambers 30 and 32 is held to a pre-selected constant value based on the spring constant and pre-load values of the check valves 48, 50. This arrangement produces a relatively constant damping force regardless of piston velocity or oil viscosity.

Figure 9:
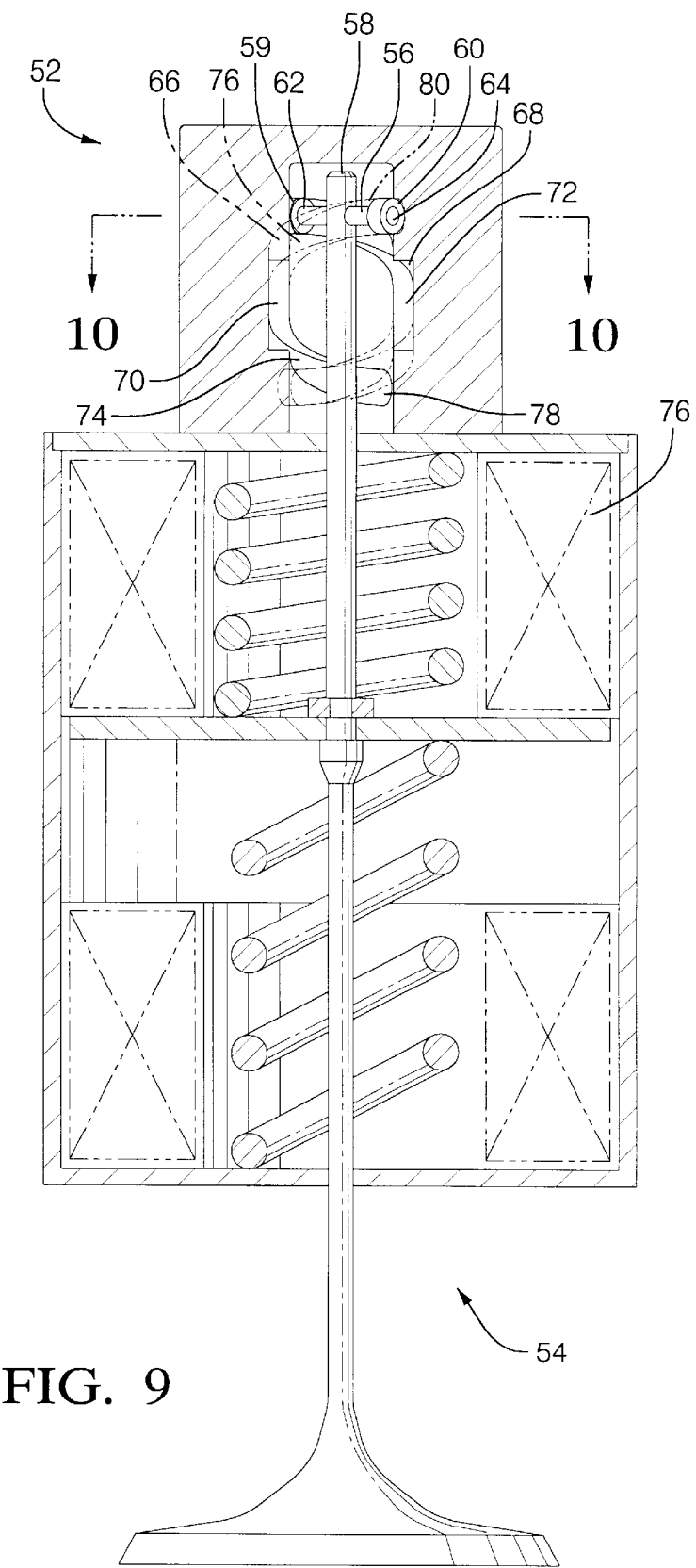
FIG. 9 is a cross-sectional view of a mechanical restraint device according to the present invention.
Figure 10:
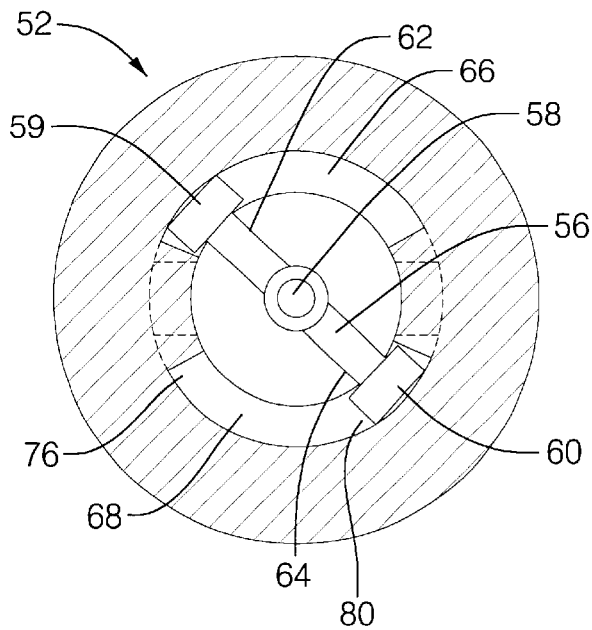
FIG. 10 is a cross-sectional view from the line 10—10 of FIG. 9 showing the mechanical restraint device.
Figure 11:
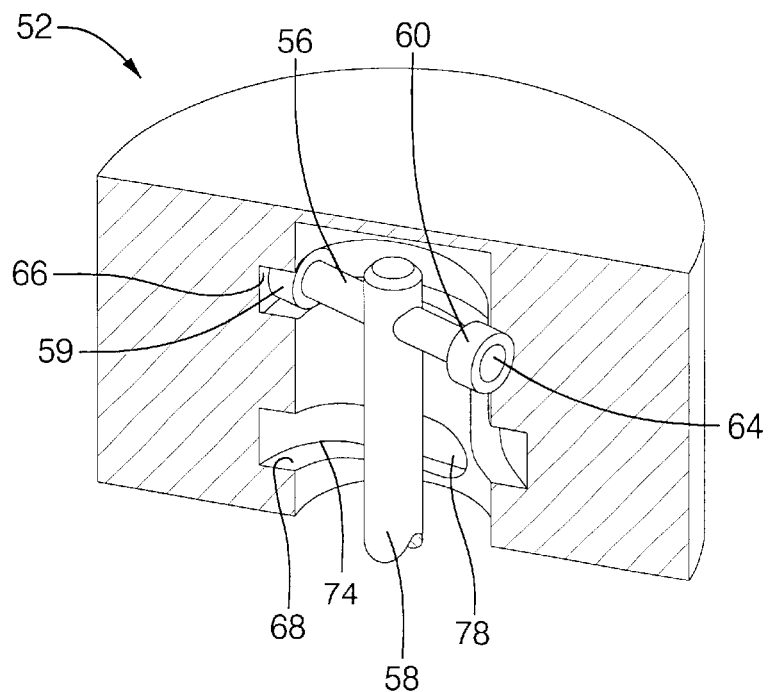
FIG. 11 is an enlarged pictorial cross-sectional view of the mechanical restraint device of FIG. 9.

FIGS. 9–11 show a mechanical restraint device 52, according to the present invention, which is adapted for use with an electromagnetic valve 54. The mechanical motion control device 52 includes a follower, here, a pin 56 transversely connected to the valve stem 58 of the valve 54. The pin 56 has roller elements 59, 60 at its opposing ends 62, 64 that are rotatably received within guide tracks 66, 68 having pre-determined rotational paths adapted to accelerate or decelerate the valve through its opening and closing action. Alternatively, the pin 56 without roller elements 59, 60 may be received within the guide tracks 66, 68 at the opposing ends 66, 68 of the pin. While the guide tracks 66, 68 may take many forms, two preferred shapes are S-like and C-like.

As shown in FIGS. 9–11, roller element 59 is received in an S-shaped guide track 66 and roller element 60 is received in opposing S-shaped guide track 68. FIG. 10 shows a downward view of the guide tracks 66, 68 taken along the line 9—9 of FIG. 9 and FIG. 11 shows an enlarged pictorial cross section of the mechanical restraint device 52.

Each guide track 66, 68 has a straight portion 70, 72 respectively, through which the pin 56 and the connected valve 54 accelerate. Taking guide track 66 as representative, the straight portion 72 terminates at both of its ends in gentle curves 74, 76 which slow the pin 56 and valve 54 assembly as the valve approaches its valve seated position or its valve open position, as the case may be. When current is supplied to the electromagnetic opening coil 76, the rolling pin 56 is forced through an upwardly sloping valve-opening ramp 78, begins its fully open ramp at curve 74, accelerates through the straight away 72, begins the closing ramp at curve 76, and decelerates through the upwardly sloping valve seat ramp 80, with the valve rising and turning accordingly. The rotational motion of the valve slows the valve thereby controlling the velocity at which the valve strikes its seat and/or its opening-stop and reducing the audible noise of the valve train.

Figure 12:
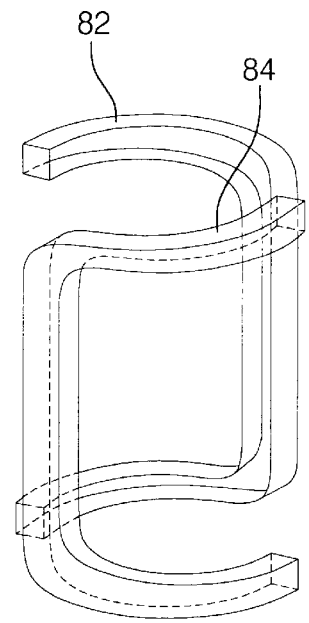
FIG. 12 is a pictorial view of a second embodiment of tracks for the mechanical restraint device of the present invention.
Figure 13:
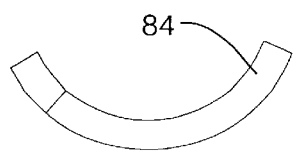
FIG. 13 is a downward view of the mechanical restraint tracks of FIG. 12.

FIGS. 12 and 13 illustrate C-shaped guide tracks 82 and 84, where FIG. 12 is a pictorial side view of the tracks and FIG. 13 is a top view.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. Motion control combined with an electromagnetic valve having an armature, a valve including a head connected by a stem with the armature for reciprocating movement between a valve closed position wherein the head engages a valve seat and a valve open position wherein the valve engages a stop, said motion control comprising:

a follower connected with the valve for reciprocating motion therewith;

a restraint operable on the follower and operative only during portions of valve motion closely adjacent the open and closed positions of the valve to slow the valve motion and reduce the force of engagement of the valve with the valve seat and the stop, the restraint including one of hydraulic and mechanical motion constraining devices.

2. Motion control as in claim 1 wherein the follower is a piston reciprocable in a cylinder and the restraint is hydraulic.

3. Motion control combined with an electromagnetic valve having an armature, a valve including a head connected by a stem with the armature for reciprocating movement between a valve closed position wherein the head engages a valve seat and a valve open position wherein the valve engages a stop, said motion control comprising:

- a follower connected with the valve for reciprocating motion therewith;
- a restraint operable on the follower and operative during valve motion approaching the open and closed positions of the valve to slow the valve motion and reduce the force of engagement of the valve with the valve seat and the stop, the restraint including one of hydraulic and mechanical motion constraining devices;
- wherein the restraint is a track engaged by the follower and operative to develop rotational motion of the valve for slowing the valve motion.

4. Motion control as in claim 3, wherein the track has an S-shape.

5. Motion control as in claim 3, wherein the track has a C-shape.

6. Motion control as in claim 3, wherein the track has a first portion through which the valve motion increases, each end of said first portion terminating with an angular portion through which the valve motion decreases.

7. Motion control combined with an electromagnetic valve having an armature, a valve including a head connected by a stem with the armature for reciprocating movement between a valve closed position wherein the head engages a valve seat and a valve open position wherein the valve engages a stop, said motion control comprising:

- a hydraulic piston connected with the valve stem and positioned within a fluid-filled cylinder and defining an upper hydraulic chamber and a lower hydraulic chamber;
- said upper and lower hydraulic chambers each having a port connecting said chambers to a bypass passage at a location spaced apart from their ends such that fluid flow through the bypass passage is regulated by the positional relationship of the piston to the ports;
- a restrictive flow tube, external to said cylinder, and connected to said upper and lower hydraulic chambers at their ends such that when said piston is positioned to block one of said ports, fluid-flow is essentially limited to said restrictive flow tube thereby slowing valve motion.

8. Motion control of claim 7, further comprising a control valve operatively connected in said restrictive flow tube for regulating fluid-flow through said flow tube when said piston is positioned to block one of said ports.

9. Motion control of claim 8, wherein said control valve comprises a pair of check valves.

10. Motion control of claim 8, wherein said control valve is an electrical control valve.

* * * * *